United States Patent [19]
Tsutsumi et al.

[11] Patent Number: 5,731,106
[45] Date of Patent: Mar. 24, 1998

[54] ELECTROLYTIC SOLUTION FOR LITHIUM SECONDARY BATTERY AND LITHIUM SECONDARY BATTERY USING THE SAME

[75] Inventors: Masami Tsutsumi; Hiroshi Horiuchi; Isao Watanabe; Tsutomu Miyashita, all of Kawasaki, Japan

[73] Assignee: Fujitsu Limited, Kawasaki, Japan

[21] Appl. No.: 653,721

[22] Filed: May 23, 1996

[30] Foreign Application Priority Data

Jan. 25, 1996 [JP] Japan ............... 8-011191

[51] Int. Cl.$^6$ ............... H01M 10/40
[52] U.S. Cl. ............... 429/197; 429/198; 429/199
[58] Field of Search ............... 429/197, 198; 469/199

[56] References Cited

U.S. PATENT DOCUMENTS

| | | | |
|---|---|---|---|
| 4,463,071 | 7/1984 | Gifford et al. | 429/199 |
| 4,489,144 | 12/1984 | Clark | 429/197 |
| 4,526,846 | 7/1985 | Kearney et al. | 429/197 |
| 4,579,796 | 4/1986 | Muramatsu | 429/199 |
| 4,714,664 | 12/1987 | Laustsen et al. | 429/197 |
| 4,874,481 | 10/1989 | Suzuki et al. | 204/59 R |
| 4,882,244 | 11/1989 | Donahue et al. | 429/198 |
| 4,888,255 | 12/1989 | Yoshimitsu et al. | 429/198 |

FOREIGN PATENT DOCUMENTS

| | | |
|---|---|---|
| 60-079677 A | 5/1985 | Japan. |
| 61-161673 | 7/1986 | Japan. |
| 3-059963 A | 3/1991 | Japan. |

OTHER PUBLICATIONS

Chemical Abstracts Accession No. 120:58549 CA. Watanabe et al. "Nonaqueous electrolyte lithium batteries with long shelf and cycle lives", JP 05251089 Sep. 28, 1993.
Chemical Abstracts Accession No. 117:73195 CA, Oshita et al. "Nonaqueous electroytes for lithium batteries", JP 04087155 Mar. 19, 1992.
Chemical Abstracts Accession No. 113:175556 CA, Dosono et al., "Lithium batteries containing aromatic nitrogen compounds", JP 02158059 Jun. 18, 1990.
Morrison and Boyd, "Organic Chemistry", 3rd Edition, Allyn and Bacon, Publishers pp. 1002–1006 and 1010–1012. (no month) 1981.

*Primary Examiner*—Prince Willis, Jr.
*Assistant Examiner*—Carol Chaney
*Attorney, Agent, or Firm*—Armstrong, Westerman, Hattori, Mcleland & Naughton

[57] ABSTRACT

An electrolytic solution for a lithium secondary battery is provided, which comprises: an electrolyte; an organic solvent; and an additive, wherein the additive is an aromatic nitrogen-containing heterocyclic compound such as pyrazine, quinoxaline, indole, phenazine, phthalazine, pyrimidine, or a mixture thereof.

8 Claims, 2 Drawing Sheets

ELECTROLYTIC SOLUTION FOR LITHIUM SECONDARY BATTERY AND LITHIUM SECONDARY BATTERY USING THE SAME

BACKGROUND OF THE INVENTION

1. Field of the Invention

The present invention relates to an electrolytic solution for a lithium secondary battery and to a lithium secondary battery using the same. More particularly, the invention relates to an electrolytic solution for a lithium secondary battery and to a lithium secondary battery using the same which can ensure an improved charge-discharge efficiency while providing a high voltage and a high energy density.

2. Related Art

In recent years, primary batteries employing lithium as a negative-electrode active substance thereof have been put in practical applications, attracting attentions because of their high voltage (3V to 4V) and energy density. Lithium secondary batteries have also been receiving attentions, because the lithium secondary batteries are promising which will meet portability requirements for personal computers, word-processors, handy phones and the like.

However, a high reactivity of lithium reduces the lifetime of a lithium secondary battery employing lithium as a negative-electrode active substance thereof. The cause of the shorter lifetime has not been clarified yet, but a possible cause is as follows.

Since deposition of lithium occurs at a current efficiency of about 100%, a low-conductivity film (nonconductive film) is formed on a negative electrode of the lithium secondary battery. When the polarity is reversed and the deposited lithium is dissolved, the nonconductive film is hardly dissolved or is not dissolved at all. Thus, the amount of lithium to be dissolved is gradually decreased, and finally the lifetime of the secondary battery expires.

It is considered that the formation of the nonconductive film results from a reaction between highly reactive lithium ions and an electrolytic solution of the secondary battery during the deposition of lithium. Further, it is reported that the nonconductive film is formed even when lithium is kept in contact with the electrolytic solution with no application of a current.

In addition, a branching tree-like crystal (dendrite) or powder of the deposited lithium prevents the electrode from coming in contact with the electrolytic solution, or separates from the electrode. Therefore, some portion of the deposited lithium cannot be utilized in the next dissolution-deposition process.

Such a phenomenon gradually degrades the lithium secondary battery (or reduces the amount of lithium to be dissolved) during a repeated charge-discharge process, thereby reducing the charge-discharge efficiency of the secondary battery.

Japanese Unexamined Patent Publications No. Hei 3(1991)-59963, No. Sho 61(1986)-161673 and No. Sho 60(1985)-79677 disclose lithium secondary batteries utilizing pyrrole, thiophene, aniline or the like as an additive to an electrolytic solution thereof. However, the lithium secondary batteries disclosed in these publications cannot provide a high voltage and a satisfactory charge-discharge efficiency during a repeated charge-discharge process.

SUMMARY OF THE INVENTION

As a result of an intensive study on a lithium secondary battery which can ensure an improved charge-discharge efficiency during a repeated charge-discharge process while providing a high voltage and a high energy density, the inventors of the present invention have found that the aforesaid problems can be solved by blending a specific additive (aromatic nitrogen-containing heterocyclic compound) in an electrolytic solution of the lithium secondary battery. Thus, the present invention has been attained.

The present invention provides an electrolytic solution for a lithium secondary battery comprising: an electrolyte; an organic solvent; and an additive; wherein the additive comprises at least one compound on a salt thereof selected from the group consisting of a compound of the general formula (I):

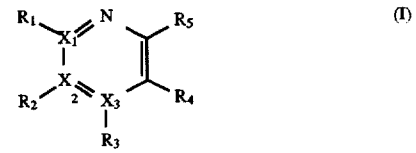

(wherein $X_1$ to $X_3$ are each a nitrogen atom or a carbon atom; $R_1$ to $R_5$ are, the same or different, each a hydrogen atom, a halogen atom, a lower alkyl group having 1 to 3 carbon atoms, a phenyl group or a hydroxyl group; when $R_1$, $R_2$, $R_4$ and $R_5$ are each a lower alkyl group having 1 to 3 carbon atoms, $R_1$ and $R_2$, or $R_4$ and $R_5$ optionally form a benzene ring cooperatively with carbon atoms bonded thereto; and when any of $X_1$, $X_2$ and $X_3$ is a nitrogen atom, $R_1$, $R_2$ or $R_3$ corresponding thereto is absent), a compound of the general formula (II):

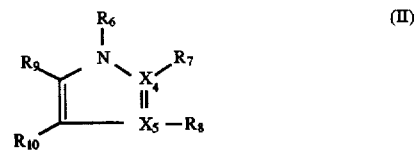

(wherein one of $X_4$ and $X_5$ is a nitrogen atom and the other is a carbon atom; $R_6$ to $R_{10}$ are, the same or different, each a hydrogen atom, a halogen atom, a lower alkyl group having 1 to 3 carbon atoms, a phenyl group or a hydroxyl group; and when any of $X_4$ and $X_5$ is a nitrogen atom, $R_7$ or $R_8$ corresponding thereto is absent), and a compound of the general formula (III):

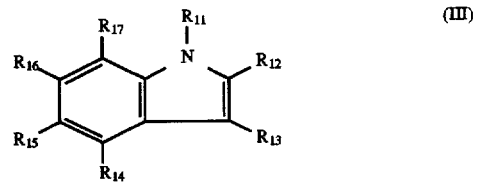

(wherein $R_{11}$ to $R_{17}$ are, the same or different, each a hydrogen atom, a halogen atom, a lower alkyl group having 1 to 3 carbon atoms, a phenyl group or a hydroxyl group).

The present invention further provides a lithium secondary battery comprising: an electrolytic solution as described above; a positive electrode; and a negative electrode.

DESCRIPTION OF THE PREFERRED EMBODIMENTS

Figure 1:
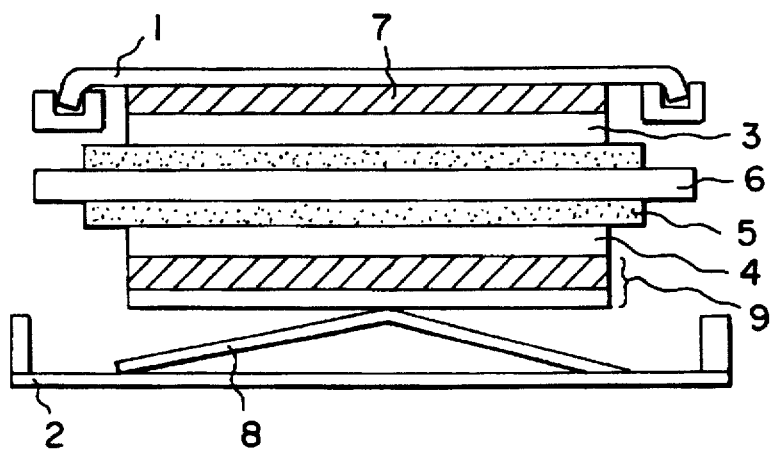
FIG. 1 is a schematic sectional view illustrating the construction of coin-type cells employed in Examples.

In the aforesaid formulae (I) to (III), examples of the halogen atom for $R_1$ to $R_{17}$ includes chlorine atom and bromine atom. Examples of the lower alkyl group having 1 to 3 carbon atoms include methyl, ethyl, propyl and isopropyl.

The phenyl group may have a substituent, examples of which includes the halogen atom and the lower alkyl group. Further, where $R_1$, $R_2$, $R_4$ and $R_5$ are each a lower alkyl group having 1 to 3 carbon atoms, $R_1$ and $R_2$, or $R_4$ and $R_5$ may form a benzene ring together with carbon atoms bonded thereto.

The additives of the formulae (I) to (III) may be used either alone or in mixture.

Exemplary compounds of the general formula (I) include pyrazine, pyridazine, pyrimidine, phenazine, phthalazine, lutidine and quinoxaline, and derivatives and salts thereof. Exemplary compounds of the general formula (II) include pyrazole, and derivatives and salts thereof. Exemplary compounds represented by the general formula (III) include indole, and derivatives and salts thereof. Among these exemplary compounds, pyrimidine, pyrazine and pyridazine are the most preferable for use as the additive.

Proper selection of substituents for the compound of the general formula (I), (II) or (III) can control the electron density of nitrogen atoms in a derivative thereof to optimize the coordination thereof with lithium ions.

Where the additive is a solid additive, the amount thereof to be blended in the electrolytic solution is 0.01% by weight to its saturation level, preferably 0.1% to 2.0% by weight. Where the additive is a liquid additive, the amount thereof to be blended is 0.01% to 5.0% by volume, preferably 0.1% to 2.0% by volume. An amount of less than 0.01% by weight or by volume is not desirable because the intended effect of improving the charge-discharge efficiency cannot satisfactorily be attained. An amount of greater than the saturation or 5.0% by volume is not desirable, because the additive is not sufficiently dissolved or blended in the electrolytic solution, resulting in an abnormal charge-discharge process.

The organic solvent to be used in the present invention is not particularly limited as long as the solvent can be used for an electrolytic solution of a lithium secondary battery. Specific examples of the organic solvents include propylene carbonate, tetrahydrofuran, diethyl carbonate, dimethylsulfoxide, γ-butyrolactone, dioxolane, 1,2-dimethoxyethane, 2-methyltetrahydrofuran, sulfolane, dimethylformamide, acetonitrile, dimethyl carbonate, ethylene carbonate and diethylene carbonate. These solvents may be used either alone or in mixture.

The electrolyte to be used in the present invention is not particularly limited as long as the electrolyte can be dissociated into lithium ions. Examples of specific electrolytes include $LiPF_6$, $LiClO_4$, $LiBF_4$, $LiAsF_6$, $LiAlCl_4$, $CF_3CO_2Li$ and $LiSbF_6$. These electrolytes may be used either alone or in mixture.

The additive to be used for the electrolytic solution according to the present invention is considered to have the following function in the electrolytic solution.

The additive has a strong coordination bonding force to metal ions. Therefore, molecules of the additive form stronger coordination bonds to lithium ions than molecules of the organic solvent to form coordination complex ions cooperatively with lithium ions. This prevents the formation of a nonconductive film which may otherwise be formed due to a reaction between the organic solvent and lithium. Since the coordination complex ions require a high voltage for deposition thereof, lithium is hardly deposited to form a branching tree-like crystal (dendrite). The additive contains an aromatic ring in its molecules and/or coordination complex ions. Therefore, the coordination complex ions are adsorbed onto a lithium surface by π electrons of the aromatic ring, thereby preventing the formation of the nonconductive film which may otherwise be formed due to the reaction between lithium and the organic solvent. Thus, the additive ensures uniform dissolution and deposition of lithium.

Further, the present invention provides a lithium secondary battery including an electrolytic solution as described above, a positive electrode and a negative electrode.

The positive electrode to be used in the present invention is composed of a mixture of a positive-electrode active substance, a conductor and a binder.

Examples of positive-electrode active substances include lithium-containing chalcogen compounds Such as $LiCoO_2$, $LiNiO_2$, $LiMnO_2$, $LiMn_2O_4$ and $LiMn_3O_6$.

Examples of specific conductors include acetylene black, graphite and carbon.

Examples of binders include Teflon and ethylene-propylene-diene terpolymer.

Usable as the negative electrode in the present invention are lithium and alloys thereof. Exemplary lithium alloys include lithium-aluminum alloy, lithium-magnesium alloy.

The positive electrode and the negative electrode may, as required, be formed on a collector of aluminum, copper or a like metal.

A separator may be provided between the positive electrode and the negative electrode to retain the electrolytic solution and to prevent a short circuit therebetween. The material for the separator is not particularly limited as long as the material is not soluble in the electrolytic solution and is an insulating material which is easy to process. Exemplary materials for the separator include porous polypropylene and porous polyethylene.

The lithium secondary battery according to the present invention maybe of a cylindrical shape, a square shape, a button shape, a sheet shape or the like.

The lithium secondary battery according to the present invention, which uses the electrolytic solution having the aforesaid characteristics, ensures an improved charge-discharge efficiency while providing a high voltage and a high energy density. Thus, the cycle number for the charge-discharge process in the lithium secondary battery is increased.

EXAMPLES

The present invention will be further illustrated by the following examples.

Example 1 and Comparative Example 1

Electrolytic solutions of Example 1 and Comparative Example 1 were charged in lithium secondary batteries of a coin-type cell as shown in FIG. 1, and evaluated by determining the charge-discharge characteristics of the lithium secondary batteries under conditions as given below.

An $LiPF_6/EC.DMC$ electrolytic solution (standard solution) containing 1 mol/l $LiPF_6$ (lithium hexafluorophosphate) as an electrolyte dissolved in an organic solvent mixture containing ethylene carbonate (EC) and dimethyl carbonate (DMC) in a volume ratio of 1:2 was prepared as the electrolytic solution to be used in Comparative Example 1. An electrolytic solution to be used in Example 1 was prepared by adding 1.0% by weight of pyrazine to the standard solution. The electrolytic solutions of Example 1 and Comparative Example 1 were each charged in a container (battery cans 1 and 2) of the coin-type cell.

A positive electrode 3 including a positive-electrode active substance of $LiMn_3O_6$, a negative electrode 4 of lithium, an electrolytic solution retainer 5 of a glass fiber paper and a separator 6 of polypropylene were provided in the container. A collector 7 of a stainless mesh was provided between the battery can 1 and the positive electrode 3. The negative electrode 4 was disposed on a collector 9, and a spring 8 was disposed between the collector 9 and the battery can 2. The negative electrode 4 of lithium had a thickness of 70 µm and a diameter of 15 mmΦ. The positive electrode 3 contained 30 mg of $LiMn_3O_6$ as the positive-electrode active substance and had a diameter of 15 mmΦ.

Figure 2:
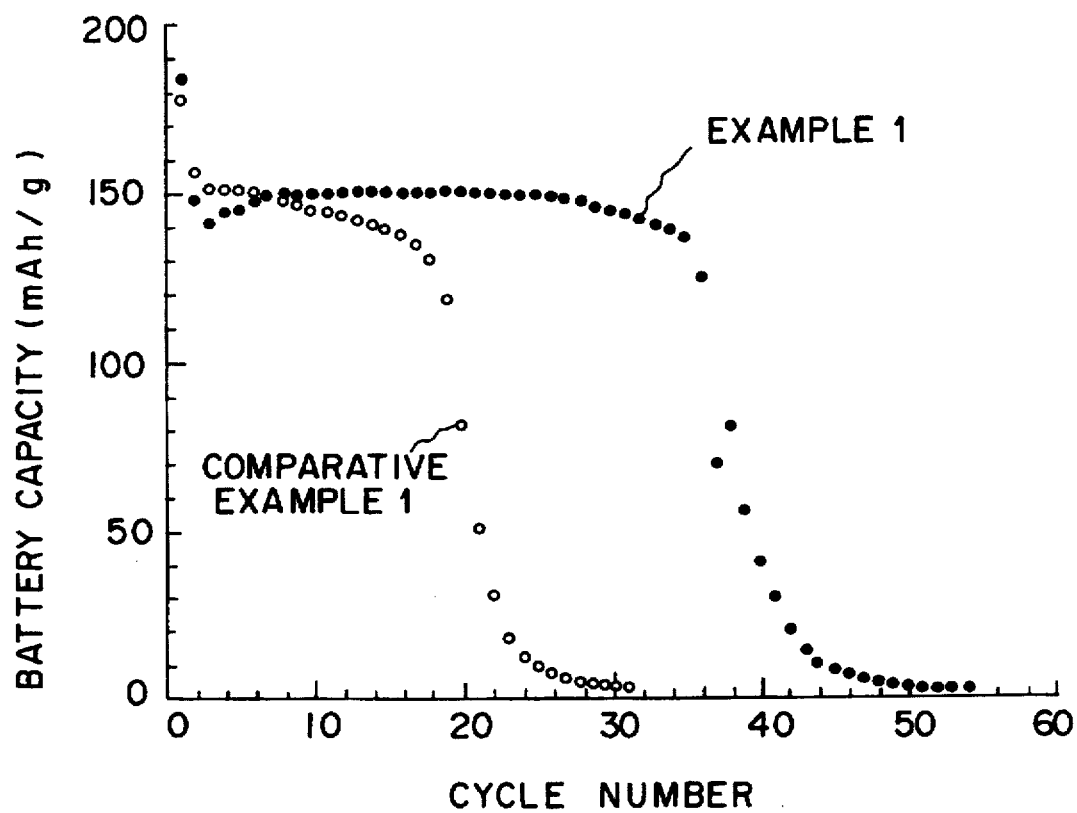
FIG. 2 is a graphical representation illustrating the relationship of the cycle number versus the battery capacity in Example 1 and Comparative Example 1.

The charge-discharge test on the coin-type cell of the aforesaid construction was performed under the following conditions. The coin-type cell was charged to 3.5V and discharged to 2.0V at a current density of 1.0 mA/cm$^2$ during a repeated charge-discharge process by applying a predetermined voltage between the positive electrode 3 and the negative electrode 4. The battery capacity of the coin-type cell was measured during the charge-discharge process, and the measurements thereof were plotted in a graph. A cycle number at which the battery capacity was reduced to 80% of an initial battery capacity was regarded as a lifetime expiration, and used for the evaluation of the electrolytic solution for the lithium secondary battery. The relationship of the cycle number versus the battery capacity is shown in FIG. 2, in which ● and ○ correspond to Example 1 and Comparative Example 1, respectively.

Further, electrolytic solutions containing various amounts of pyrazine were each charged in a coin-type cell, and evaluated by determining the lifetime of the coin-type cell. The results are shown in Table 1.

TABLE 1

| Amount of pyrazine (wt %) | Cycle number |
|---|---|
| 0 | 17 |
| 0.01 | 20 |
| 0.1 | 28 |
| 0.5 | 30 |
| 1.0 | 36 |

As is apparent from FIG. 2 and Table 1, a comparison between Comparative Example 1 (without pyrazine added) and Example 1 (with pyrazine added) indicates that the addition of pyrazine increased the cycle number for charge-discharge process, and significantly improved the charge-discharge characteristics of the coin-type cell. Thus, the lithium secondary battery using pyrazine (or a derivative thereof) as an additive for the non-aqueous electrolytic solution thereof has an improved charge-discharge efficiency while providing a high voltage and a high energy density.

Example 2

An electrolytic solution of Example 2 was prepared in substantially the same manner as in Example 1, except that 0.5% by volume of pyrimidine was blended as an additive with the standard solution. The electrolytic solution was evaluated by performing the charge-discharge test in the same manner as in Example 1. The result is shown in FIG. 3, in which the measurements obtained in Comparative Example 1 are also plotted and ● and ○ correspond to Example 2 and Comparative Example 1, respectively.

Figure 3:
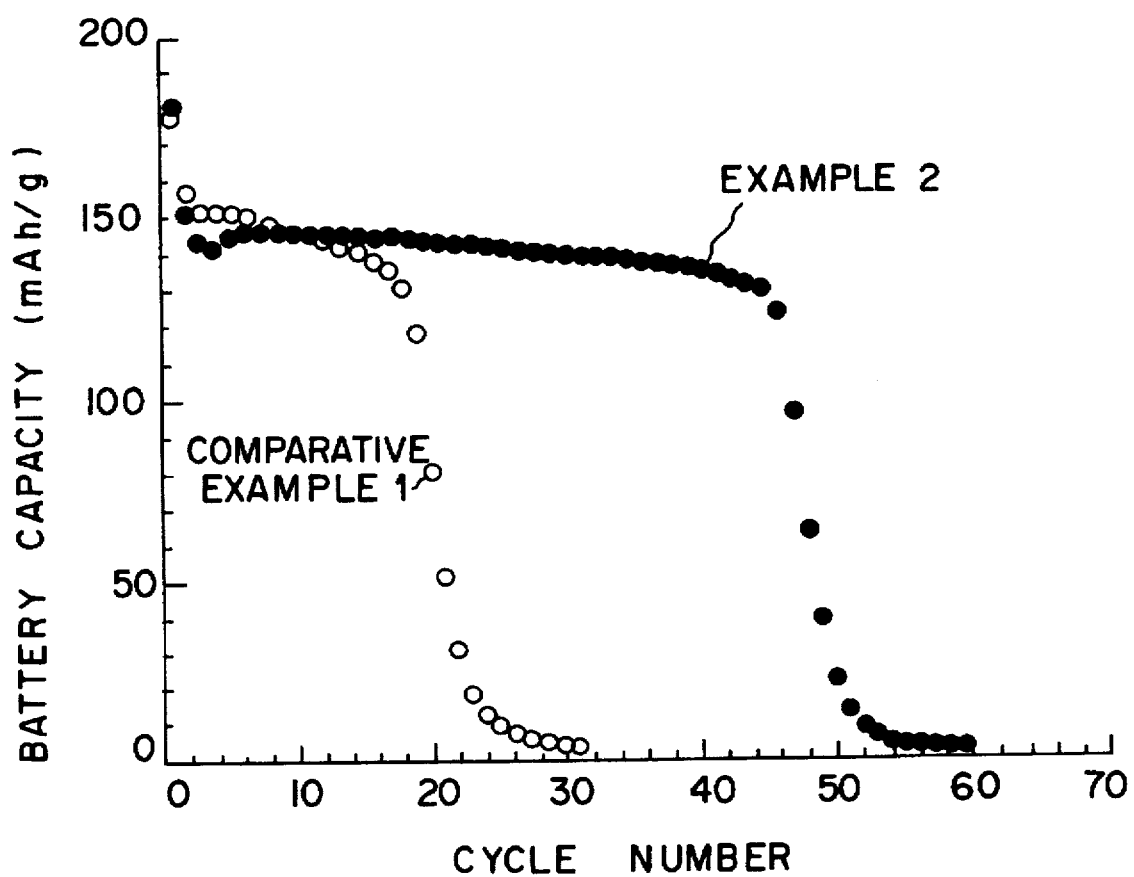
FIG. 3 is a graphical representation illustrating the relationship of the cycle number versus the battery capacity in Example 2 and Comparative Example 1.

As is apparent from FIG. 3, a comparison between Comparative Example 1 (without pyrimidine added) and Example 2 (with pyrimidine added) indicates that the addition of pyrimidine increased the cycle number for charge-discharge process and improved the charge-discharge characteristics of a coin-type cell. Thus, the lithium secondary battery using pyrimidine (or a derivative thereof) as an additive for the non-aqueous electrolytic solution thereof has an improved charge-discharge efficiency while providing a high voltage and a high energy density.

Examples 3 to 9

Electrolytic solutions were prepared in substantially the same manner as in Example 1, except that quinoxaline (Example 3), indole (Example 4), 2,3-lutidine (Example 5), N-methylpyrazole (Example 6), phenazine (Example 7), phthalazine (Example 8) and pyridazine (Example 9) were each added to the standard solution in two different amounts. The electrolytic solutions were evaluated by performing the charge-discharge test in the same manner as in Example 1. The results are shown in Table 2.

TABLE 2

| Additive | Amount of additive | Cycle number |
|---|---|---|
| Quinoxaline (Example 3) | 0.1 wt % | 26 |
|  | 1.0 wt % | 18 |
| Indole (Example 4) | 0.1 wt % | 19 |
|  | 1.0 wt % | 27 |
| 2,3-Lutidine (Example 5) | 0.5 vol % | 27 |
|  | 5.0 vol % | 37 |
| N-Methylpyrazole (Example 6) | 0.5 vol % | 27 |
|  | 5.0 vol % | 33 |
| Phenazine (Example 7) | 0.1 wt % | 23 |
|  | 1.0 wt % | 18 |
| Phthalazine (Example 8) | 0.1 wt % | 34 |
|  | 1.0 wt % | 19 |
| Pyridazine (Example 9) | 0.5 vol % | 23 |
|  | 5.0 vol % | 18 |

As is apparent from Table 2, the addition of the aforesaid additives drastically improved the charge-discharge characteristics in comparison with a case where no additive was blended in the electrolytic solution. Thus, the lithium secondary batteries using nitrogen-containing aromatic heterocyclic compounds of the present invention for the non-aqueous electrolytic solution thereof each exhibit an improved charge-discharge efficiency while providing a high voltage and a high energy density.

Comparative Example 2

An electrolytic solution was prepared in substantially the same manner as in Example 1, except that pyrrole was blended as an additive with the standard solution. The electrolytic solution was evaluated by performing the charge-discharge test in the same manner as in Example 1. A lithium secondary battery using the electrolytic solution did not exhibit improved charge-discharge characteristics.

By using an electrolytic solution containing an aromatic nitrogen-containing heterocyclic compound of a general formula (I), (II)or (III)as an additive thereof for a lithium secondary battery, the cycle number for charge-discharge process is increased and the charge-discharge characteristics of the secondary battery is significantly improved. Further, a lithium secondary battery of the present invention using the aforesaid electrolytic solution can ensure improved charge-discharge characteristics while providing a high voltage and a high energy density.

What is claimed is:

1. An electrolytic solution for a lithium secondary battery comprising:

an electrolyte, an organic solvent and an additive, wherein the additive is at least one compound selected from the group consisting of compounds of the formulas:

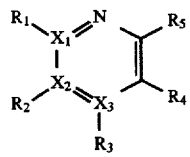

wherein $X_1$—$R_1$ is C—$R_1$ and at least one of $X_2$—$R_2$ and $X_3$—$R_3$ is N and the other is N or C—$R_1$;

$R_1$, $R_4$ and $R_5$ are each a hydrogen atom, a halogen atom, a lower alkyl group having 1 to 3 carbon atoms, a phenyl group or a hydroxyl group; and when $R_4$ and $R_5$ are each a lower alkyl group having 1 to 3 carbon atoms, $R_4$ and $R_5$ together with the carbon atoms to which they are bonded may form a benzene ring;

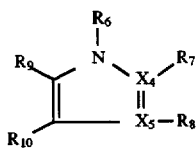

wherein $X_4$—$R_7$ is C—$R_7$ and $X_5$—$R_8$ is N; and $R_6$, $R_7$, $R_9$ and $R_{10}$ are each a hydrogen atom, a halogen atom, a lower alkyl group having 1 to 3 carbon atoms, a phenyl group or a hydroxyl group; and

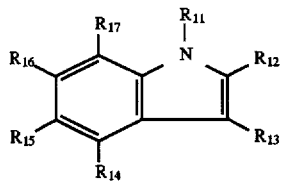

wherein $R_{11}$ to $R_{17}$ are each a hydrogen atom, a halogen atom, a lower alkyl group having 1 to 3 carbon atoms, a phenyl group or a hydroxyl group.

2. An electrolytic solution as set forth in claim 1, wherein the additive is pyrazine, quinoxaline, indole, phenazine, phthalazine or pyrimidine, or a mixture thereof.

3. An electrolytic solution as set forth in claim 1, wherein the additive is a solid and the solution contains 0.01% by weight to its saturation level of the solid additive.

4. An electrolytic solution as set forth in claim 1, wherein the additive is a liquid and the solution contains 0.01 to 5.0% by volume of the liquid additive.

5. A lithium secondary battery comprising an electrolytic solution as recited in claim 1, a positive electrode and a negative electrode.

6. A lithium secondary battery as set forth in claim 5, wherein the negative electrode is lithium, a lithium-aluminum alloy or a lithium-magnesium alloy.

7. A lithium secondary battery as set forth in claim 5, wherein the positive electrode is composed of a mixture of a positive-electrode active substance, a conductor and a binder.

8. A lithium secondary battery as set forth in claim 7, wherein the positive-electrode active substance is $LiCoO_2$, $LiMnO_2$, $LiMn_2O_4$ or $LiMn_3O_6$.

* * * * *